Patented Jan. 23, 1940

2,187,844

UNITED STATES PATENT OFFICE 2,187,844

MANUFACTURE OF COATED STRIP FOR TUBING PRODUCTION

Charles A. Scharschu, Brackenridge, Pa., assignor to Allegheny Steel Company, a corporation of Pennsylvania No Drawing. Application December 29, 1936, Serial No. 118,122. Renewed November 28, 1938

13 Claims. (Cl. 148—16)

This invention relates to the manufacture of metal tubing by what is known as the hydrogen brazing or welding method as well as to the manufacture of coated metal strip suitable for use in the making of tubing by such method.

At the present time, tubing in large quantities is made from copper coated steel strip by the hydrogen brazing or welding method. In the manufacture of this tubing, a copper coated steel strip wound into a long spiral with the overlapping portions in tight contact, is passed through a furnace maintained at a temperature just above the melting point of the copper. The furnace is provided with an atmosphere which contains sufficient hydrogen and other neutral or reducing gases to prevent oxidation of the copper which forms the strip coating. When this coated and spirally wound strip is passed through the furnace, the copper coating melts thus brazing or welding together the overlapping and contacting portions of the strip to form a solid tube.

This method, which is now largely used, produces very satisfactory tubing when the coated strip is in proper condition. Such tubing is suitable for many purposes and large quantities are now used in hydraulic brake installations on automobiles.

It has been found that if, when the spirally wound coated strip is passed through the furnace for the brazing or welding operation, there is present on its overlapped and contacting portions any metallic oxides which are reducible by hydrogen at or above the melting point of copper, the tubing will be defective. The reduction of these oxides by hydrogen at the temperature at which the brazing or welding operation is carried out forms water which is immediately converted into steam and the pressure which is rapidly generated forces apart these surfaces with the result that brazing or welding of these surfaces is prevented.

It will be apparent that but very little pressure is necessary to separate the contacting surfaces and prevent brazing or welding because of the fact that the spirally wound coated strip when heated to about 1900° F. (the temperature at which the brazing or welding operation is carried on) has very little strength to resist such separating pressure. When the above phenomenon occurs, the weld is not continuous and the tubing will leak or burst under pressure.

From the above it is apparent that if satisfactory tubing is to be produced, the surface of the steel strip as well as its copper coating must be free from any oxides which are reducible by hydrogen at the temperature of the brazing or welding operation.

In making the steel strip to be used in the manufacture of this tubing great care is taken in an attempt to have the surfaces of the strip clean and free from any of these metallic oxides. The steel strip is formed in the customary manner by hot and cold rolling procedures and is thoroughly cleaned and pickled prior to cold rolling and after the cold rolling operation is completed the strip is again cleaned and pickled before the copper coating is applied thereto.

It is now the practice after the strip is coated, to box anneal the same at a temperature of from 1350° F. to 1400° F. in an atmosphere containing from about 11–13% hydrogen in order to obtain strip of maximum softness. Even in view of the above cleaning and pickling operations, it is difficult to consistently produce in large tonnages coated strip free from oxides which will be reduced during the brazing or welding operation referred to and an object of this invention is to provide a method of completely removing all reducible metallic oxides on coated strip to be used in the manufacture of tubing by the hydrogen brazing or welding method.

Another object of this invention is to improve the method of making hydrogen brazed or welded tubing from copper coated steel strip.

A further object is to so improve the hydrogen brazing or welding method of making tubing from coated metal strip that its overlapping and contacting surfaces will not be forced apart during the brazing or welding operation because of the reduction of metallic oxides.

A still further object is to produce copper coated steel strip for use in the making of hydrogen brazed or welded tubing which is free from any metallic oxides which will be reduced during the procedure by means of which such strip after being spirally wound is brazed or welded.

I have found that by means of certain procedures carried out on the coated strip, before it is formed into the spiral, I can remove from such strip all reducible metallic oxides and therefore insure the production of a coated strip from which it is possible to produce perfect tubing of this type provided the subsequent welding or brazing operation is properly carried out.

Broadly, my invention consists in so treating the coated strip while flat (that is before being wound into a spiral or otherwise bent into tubular form with its edge portions overlapped) as to reduce all reducible metallic oxides which are present on the strip or coating, so that the steam that is formed when any such oxides are reduced can freely escape without any harmful results.

I do not contemplate changing the procedure for producing the steel strip, but prefer that the usual procedure be followed. In the usual procedure, the strip is produced by hot rolling until the desired hot rolled gauge is reached. It is then pickled and cleaned, then cold rolled to gauge and again cleaned and pickled. I find it preferable in most cases to normalize or anneal the hot rolled strip between the hot and cold rolling operations.

After the cold rolled strip is cleaned and pickled and is copper coated, I subject it to a treatment or procedure by means of which all reducible metallic oxides either on the surface of the strip or on or in the metallic coating are reduced. This is carried out while the coated strip is flat and by this I mean before it is bent or otherwise formed into tubular form.

I have found that I can carry out my oxide reducing treatment during the annealing procedure to which the coated strip is subjected for the purpose of obtaining the desired softness, or if desired, the coated strip can be given my oxide reducing treatment prior to the annealing procedure designed to obtain softness.

Probably the most commonly used annealing procedure for obtaining maximum softness of the coated metal strip is a box anneal at from 1350–1400° F. in an atmosphere containing 11–13% hydrogen, the annealing cycle averaging about 140 hours; taking about 30 hours to arrive at temperature; maintaining the strip at temperature for about 20 hours; the balance of the time being taken up in cooling.

I have found that if, during the 20 hour period while the coated strip is at from 1350–1400° F., a hydrogen atmosphere is maintained, all reducible metallic oxides are reduced. When copper coated steel strip treated in this manner is utilized a perfect hydrogen brazed or welded tubing can be produced, if the brazing procedure is properly carried out.

If the temperature of the box anneal is higher or if the strip is maintained at temperature for a longer period, I can accomplish reduction of the metallic oxides with a lower percentage of hydrogen, in fact with the annealing cycle above set forth and with a temperature of from 1350–1400° F., I have been able to reduce all the reducible metallic oxides by utilizing an atmosphere containing as little as 25% hydrogen and I may be able to obtain the desired results with as little as 15% hydrogen. With an annealing temperature of from 1350–1400° F. which is the preferable temperature for obtaining maximum softness of the material, I prefer to be on the safe side and therefore prefer to utilize an atmosphere containing substantially 100% hydrogen during the time the strip is at annealing temperature. I have found that if I use an atmosphere of 100% hydrogen or approximately 100% hydrogen, it is not necessary to maintain such atmosphere throughout the entire time that the material is at annealing temperature, but for the purpose of insuring complete reduction of all reducible oxides, I prefer to maintain the hydrogen atmosphere throughout at least the period of maximum temperature.

I have found that I can reduce all reducible metallic oxides prior to the box annealing procedure for obtaining maximum softness and in practicing this alternative method, I prefer to pass the coated strip in flat condition through a normalizing furnace maintained at about 1900° F. and having an atmosphere containing a percentage of hydrogen sufficient to reduce, at such temperature, all reducible metallic oxides on the strip and on and in the coating metal. The time at which the strip is maintained at annealing temperature will vary in accordance with the percentage of hydrogen in the atmosphere, and I have found that by utilizing a temperature of 1900° F., an atmosphere containing as little as 10% hydrogen with the strip maintained at temperature from two to three minutes I can obtain satisfactory results.

When such a treatment is followed by a box anneal of the type now commonly used, the strip will have maximum softness and will be free from any reducible metallic oxides.

In order to be on the safe side and still have the normalizing treatment of relatively short duration, I prefer to utilize an atmosphere containing a higher percentage of hydrogen say from 15 to 20%.

If the softness obtained by this normalizing operation is satisfactory, then the box anneal can be omitted.

I do not wish to limit my invention to copper coated steel strip for use in the production of tubing by the hydrogen brazing or welding method nor to the production of tubing from such strip by this method. This method of producing tubing is applicable to other metal combinations and my invention is applicable to the reduction of reducible metallic oxides on all coated strip which is suitable for the production of tubing by the hydrogen brazing or welding method.

The coating metal may be applied to the strip in any suitable manner, but it is usually preferable to deposit the coating electrolytically.

Having thus described my invention, what I claim as new and desire to secure by Letters Patent is:

1. In a method of manufacturing metal tubing wherein a strip of ferrous metal is coated with another metal having a lower melting point, is formed into tube form with overlapping and contacting portions and is heated in an atmosphere containing hydrogen and to a temperature sufficient to cause brazing or welding of said overlapping and contacting portions, the step which consists in box annealing the coated strip before it is formed into tube form at a temperature of from about 1350° F. to about 1400° F. in an atmosphere containing at least 15% of hydrogen.

2. In a method of manufacturing metal tubing wherein a strip of ferrous metal is coated with another metal having a lower melting point, is formed into tube form with overlapping and contacting portions and is heated in an atmosphere containing hydrogen and to a temperature sufficient to cause brazing or welding of said overlapping and contacting portions, the step which consists in box annealing the coated strip before it is formed into tube form at a temperature of from about 1350° F. to about 1400° F. in an atmosphere containing at least 25% of hydrogen.

3. In a method of manufacturing metal tubing wherein a strip of metal is coated with another metal having a lower melting point, is formed into tube form with overlapping and contacting portions and is heated in an atmosphere containing hydrogen and to a temperature sufficient to cause brazing or welding of said overlapping and contacting portions, the step which consists in heating the coated strip to a temperature of about 1900° F. in an atmosphere containing sufficient hydrogen to reduce all oxides on the strip and coating metal which would be reduced during said brazing or welding operation.

4. In a method of manufacturing metal tubing wherein a strip of metal is coated with another metal having a lower melting point, is formed into tube form with overlapping and contacting portions and is heated in an atmosphere containing hydrogen and to a temperature sufficient to cause brazing or welding of said overlapping and contacting portions, the step which consists in heating the coated strip to a temperature of about 1900° F. for from one to three minutes in an atmosphere containing sufficient hydrogen to reduce all oxides on the strip and coating metal which would be reduced during said brazing or welding operation.

5. In a method of manufacturing metal tubing wherein a strip of metal is coated with another metal having a lower melting point, is formed into tube form with overlapping and contacting portions and is heated in an atmosphere containing hydrogen and to a temperature sufficient to cause brazing or welding of said overlapping and contacting portions, the step which consists in heating the coated strip to a temperature of about 1900° F. in an atmosphere containing at least 15% hydrogen.

6. In a method of manufacturing metal tubing wherein a strip of metal is coated with another metal having a lower melting point, is formed into tube form with overlapping and contacting portions and is heated in an atmosphere containing hydrogen and to a temperature sufficient to cause brazing or welding of said overlapping and contacting portions, the step which consists in heating the coated strip to a temperature of about 1900° F. in an atmosphere containing at least 10% hydrogen.

7. In the manufacture of metal coated steel strip suitable for use in making hydrogen brazed or welded tubing, the step which consists in normalizing the coated strip at about 1900° F. in an atmosphere containing sufficient hydrogen to reduce all metallic oxides on the strip and coating.

8. In the manufacture of metal coated steel strip suitable for use in making hydrogen brazed or welded tubing, the step which consists in box annealing the coated strip at a temperature of from about 1350° F. to about 1400° F. in an atmosphere containing sufficient hydrogen to reduce all metallic oxides on the strip and coating.

9. In a method of making metal tubing of the character described, providing a steel strip with a thin copper coating and, prior to making up a tube therefrom, subjecting the copper coated steel strip to an annealing operation at a temperature of about 1350–1400° F. in an atmosphere containing hydrogen for such period of time as will reduce the oxide content of such steel strip and coating.

10. In a method of making metal tubing of the character described, providing a steel strip with a thin copper coating and, prior to making up a tube therefrom, subjecting the copper coated steel strip to an annealing operation at a temperature of about 1350–1400° F. in an atmosphere containing at least about 15% hydrogen during the maximum temperature of the anneal for such period of time as will reduce the oxide content of such steel strip and coating.

11. In a method of making metal tubing of the character set forth, the steps which comprise providing a metal strip with a thin metallic coating, subjecting the coated strip to a box annealing operation in a hydrogen atmosphere at a temperature not less than about 1350° F. and not more than about 1900° F. prior to forming the coated strip into tubing and continuing such annealing for a period of time sufficient to reduce the oxide content of both the metal strip and the metal coating.

12. In a method of making metal tubing wherein a strip of metal is coated with another metal having a lower melting point, is formed into tube form with overlapping and contacting portions and is heated in an atmosphere containing hydrogen to a temperature sufficient to cause brazing or welding of said overlapping and contacting portions, the steps which comprise heating the coated strip relatively slowly to a temperature not less than about 1350° F. nor more than about 1900° F., confining the coated strip during such heating in an atmosphere containing sufficient hydrogen to reduce chemically the oxides on the strip and coating and maintaining such material under such conditions for a period of time sufficient to effect such chemical reduction of the oxides.

13. In a method of making metal tubing of the character set forth, the steps which comprise providing a metal strip with a metallic coating and box annealing the coated strip in a hydrogen-containing atmosphere at a temperature of from about 1300° F. to about 1900° F. prior to forming the coated strip into tubing.

CHARLES A. SCHARSCHU.